United States Patent Office 2,901,483
Patented Aug. 25, 1959

2,901,483

PROCESS FOR THE PREPARATION OF LACTONES IN THE YOHIMBANE SERIES

Martin Eric Kuehne, Summit, N.J., assignor to Ciba Pharmaceutical Products, Inc., Summit, N.J., a corporation of New Jersey No Drawing. Application May 29, 1956
Serial No. 587,923

12 Claims. (Cl. 260—286)

This invention relates to a new process for the preparation of compounds having the allo-yohimbane structure, their optical antipodes and racemates and salts thereof. It also concerns certain new products obtained as intermediates in this process. More particularly the invention relates to a process for the preparation of lactones of the following formula:

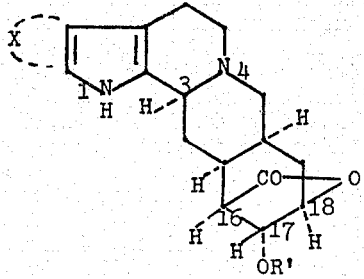

wherein X represents the unsubstituted or substituted remainder of a benzene nucleus and R' stands for lower alkyl, the corresponding 18-hydroxy-16-carboxylic acid and alkyl 18-hydroxy-16-carboxylates, and salts thereof. The substituents of the benzene nucleus may be for example halogen atoms, e.g. chlorine, bromine or fluorine; lower alkyl, e.g. methyl or ethyl; or preferably lower alkoxy, e.g. methoxy, ethoxy or methylenedioxy. These substituents are advantageously in 10- and/or 11-position of the reserpine ring skeleton, preferably in 11-position. R' represents especially methyl or ethyl.

These compounds may be laevo-rotatory, dextro-rotatory or racemates. They are intermediates in the preparation of compounds which are used in the synthesis of pharmacologically active compounds such as reserpine, deserpidine or rescinnamine.

The lactones or salts thereof obtained according to the process of the invention can be converted into compounds of the following formula:

wherein X and R' have the above-mentioned meanings and Z stands for —COOH or COOR, R being a lower alkyl residue and R" represents hydrogen or an acyl residue, or salts thereof by customary methods. Upon treatment of the lactones with hydrolyzing or alcoholizing agents such as alkali or earth alkaline metal hydroxides, carbonates, lower alcoholates or amines the lactone ring can be split. The compounds thus obtained having a free or esterified carboxyl group and a free hydroxyl group can be converted into diesters or salts thereof by known methods. Carboxyl groups may be esterified for example by treatment with a diazoalkane, e.g. diazomethane, or by treatment with a lower alcohol in the presence of an esterification catalyst, e.g. ethanol in the presence of hydrochloric acid. Compounds having free hydroxyl groups may be esterified for example by treatment with an acid halide such as 3,4,5-dimethoxybenzoyl chloride, 3,4,5-trimethoxycinnamoyl chloride or acetylbromide. Compounds or salts thereof of the general formula given above may be isomerized to compounds of the general formula:

wherein X, Z, R' and R" have the above-given meanings, or salts thereof according to the procedure described and claimed in copending application Serial No. 576,804, filed April 9, 1956 by Charles F. Huebner (now abandoned). These compounds such as reserpine, deserpidine or rescinnamine are of great therapeutic value or represent intermediates in the preparation of such compounds into which they can be converted according to known methods, which are exemplified on the laevo-rotatory compounds in U.S. Patent No. 2,824,874, issued February 25, 1958 to E. Schlittler.

Furthermore, the lactones or salts thereof obtained by the process of the invention can be isomerized to the lactones of the formula:

or salts thereof by the process described by R. B. Woodward et al., J. Amer. Chem. Soc. 78, 2023 (1956). The lactones thus-obtained can be split and converted into therapeutically useful compounds or salts thereof according to the procedures outlined above for the compounds of the 3-iso-series or as indicated in the above publication of R. B. Woodward et al.

The new process for the preparation of the compounds outlined above makes them available as intermediates in the totally synthetic preparation of products such as reserpine, deserpidine or rescinnamine which are known for their usefulness as sedative and hypotensive agents.

This process consists in converting a compound of the formula:

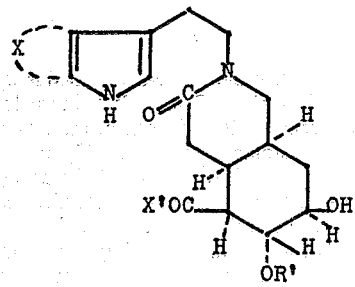

into a lactone of the formula:

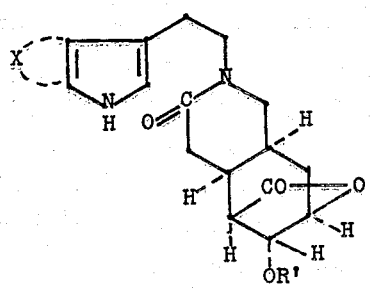

and subjecting this compound to the action of a ring-closing agent to form a compound of the formula:

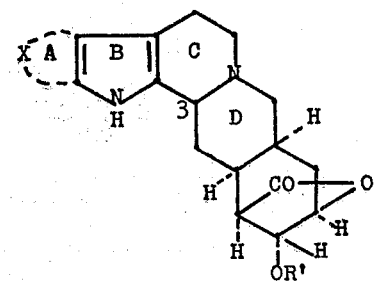

having a double bond extending from the carbon atom 3, such as a compound of the formula:

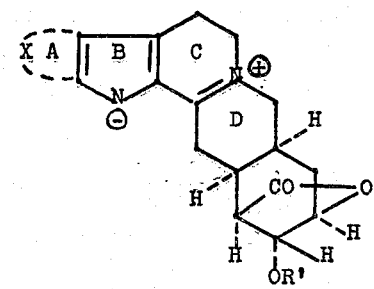

or its salts.

The unsaturated compound, for example in the form of a salt thereof, is then reduced to the corresponding compound saturated in ring D.

The starting material can be used in the form of the optically active antipodes or the racemate. Racemates obtained in any stage of the process can be resolved to the optically active antipodes and may be used in either form for the remaining steps. Final compounds, if racemates, may also be resolved. The usual method for resolving is used, e.g. the reaction of the racemate with an optically active base or acid, as the case may be, and separating the diastereoisomeric compounds by fractional crystallization, and setting free the desired optically active compound.

In the above formulae X has the meaning indicated above, X' represents a hydroxyl group or a radical forming together with the carbonyl group a reactive functionally converted carboxyl group, and R' stands for a lower alkyl radical.

A reactive functional converted carboxyl group is, for example, a carbalkoxy group, such as the carbomethoxy- or carbethoxy group. To effect the lactonization the radical X' is split off together with the hydrogen atom of the hydroxyl group in 18-position. To accomplish, for example, the splitting off of a hydroxyl group together with the hydrogen atom there are used dehydrating agents such as acid anhydrides or halides, e.g. acetic anhydride, thionyl chloride, phosphorus oxyhalides, carbodiimides such as dicyclohexyl carbodiimide etc. In case X' being alkoxy the corresponding alcohol is split off to form the lactone, for example by heating the compound with or without the use of a solvent, preferably in the presence of a lactonizing catalyst such as a higher alcoholate, for example, aluminum phenolate or aluminum tertiary butoxide, or under other appropriate alkaline or acidic conditions.

The ring closure of the thus-obtained lactone is effected by treatment with dehydrating ring-closing agents, such as polyphosphoric acids, phosphoric acid, phosphorus oxyhalides or phosphorus halides etc. Under appropriate conditions, it is possible to conduct this ring-closure in the same operation as the lactone formation.

The reduction of the compound unsaturated in ring D is preferably carried out with reducing agents hydrogenating exclusively the non-indolic carbon-to-carbon double bond in ring D. Such reducing agents are, for example, of alkaline nature, e.g. sodium borohydride, alkali metals in lower alkanols or ammonia or sodium amalgam in moist solvents. Catalytic hydrogenation can be employed as well, such as hydrogenation in the presence of a catalyst containing a metal of the eighth group of the periodic system or an oxide thereof, e.g. platinum, palladium, nickel or especially platinum oxide. Furthermore, reduction can be accomplished by using metals such as zinc in an acid medium such as acetic acid.

Depending upon the conditions used the lactone may be hydrolyzed or alcoholized and the product of the reduction step may be the corresponding 18-hydroxy-16-carboxylic acid or the alkyl 18-hydroxy-16-carboxylate. The lactone ring may be split especially by using an alkaline medium in the reduction step, such as catalytic hydrogenation in the presence of alkaline or earth alkaline metal hydroxide such as sodium hydroxide or by using an alkali metal in the presence of an alkanol.

Depending on the working conditions employed the compounds and the intermediates are obtained in the form of the free bases or the salts. From the salts the free bases can be obtained in the usual manner; the bases can be converted into their salts, for example those with organic or inorganic acids such as hydrohalic acids, e.g. hydrochloric acid or nitric acid, sulfuric acid, phosphoric acids, perchloric acid, acetic, citric oxalic, tartaric, ascorbic, methane sulfonic, hydroxyethane sulfonic, p-toluene sulfonic acid or salicylic, p-amino-salicylic acid or acetyl-salicylic acid, for example by treating the bases with the corresponding acids. Products obtained having a free carboxylic acid group may be obtained in the form of their metal salts such as sodium or potassium salts, which yield the free carboxylic acid upon treatment with an acid.

The starting materials used in the process of the invention are known and can for example be obtained in the following manner: quinone is reacted with 1,4-butadiene-1-carboxylic acid in a Diels-Alder addition. The 6,9-dioxo-1,4,5α,6,9,10α-hexahydronaphthalene-1β-carboxylic acid of the formula:

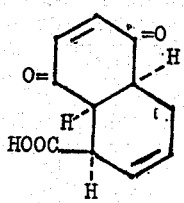

is then reduced with sodium borohydride to 6β-hydroxy-9-oxo-1,4,5α,6,9,10α-hexahydronaphthalene-1β-carboxylic acid yielding by oxidation with perbenzoic acid 2,3α-oxido-6β-hydroxy-9-oxo- 1,2,3,4,5α,6,9,10α - octahydronaphthalene-1β-carboxylic acid of the formula:

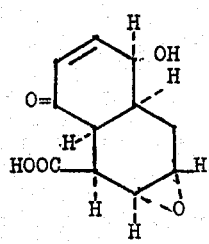

This compound, after esterification with diazomethane is subjected to a Meerwein-Ponndorf reduction with aluminum isopropoxide to yield the (1β→9β)-lactone of 3,6β-oxido-9β-hydroxy- 3,4,5α,6,9,10α - hexahydronaphthalene-1β-carboxylic acid of the formula:

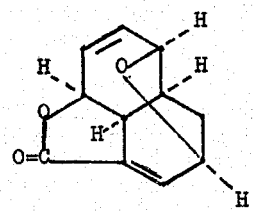

which by addition of a lower alkanol to the double bond in 1-position is converted into a (1β→9β)-lactone of 2α-lower alkoxy-3,6β-oxido-9β- hydroxy - 1,2,3,4,5α,6,9,10α-octahydronaphthalene-1β-carboxylic acid. Addition of bromohydrine to the double bond in 7-position results in the (1β→9β)-lactone of 2α-lower alkoxy-3,6β-oxide-7α-bromo-8β, 9β-dihydroxy-1,2,3,4,5α,6,7,8,9,10α-decahydronaphthalene-1β-carboxylic acid. Oxidation with chromic acid to the corresponding 8-oxo-compound, followed by reduction with zinc and acetic acid yields 2α-lower alkoxy-3β-hydroxy-8-oxo-1,2,3,4,5α,8,9,10α-octahydronaphthalene-1β-carboxylic acid of the formula:

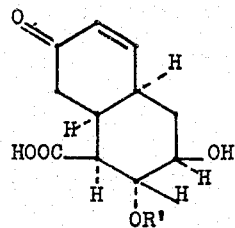

Esterification with diazomethane, acetylation with acetic acid anhydride in pyridine, oxidation with osmium tetroxide and oxidative degradation with periodic acid gives 2α-lower alkoxy-3β-acetoxy-5β-aldehydo-6β-carboxy-methyl-cyclohexane-1β-carboxylic acid methyl ester. This after esterification with diazomethane is condensed with a tryptamine of the formula:

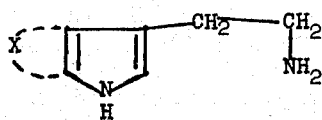

wherein X has the aforesaid meaning to yield a compound of the formula:

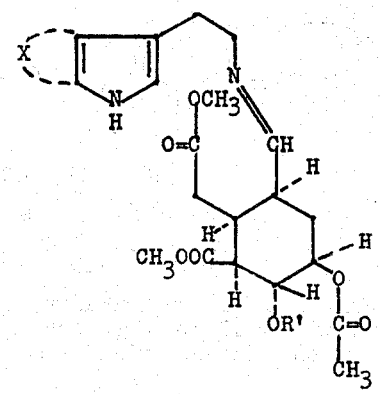

Reduction with sodium borohydride and ring closure with heating results in a compound of the formula:

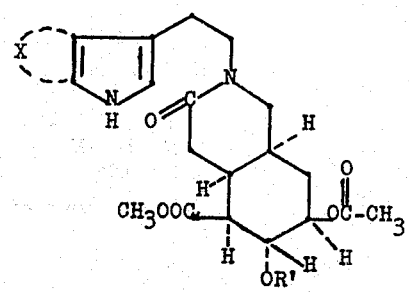

which can be hydrolyzed to the free hydroxy acid by treatment with sodium methoxide in methanol under anhydrous conditions.

My invention also comprises the new optically active or racemic intermediates formed in the process of the invention. Intermediates contemplated are the lactones of the formula:

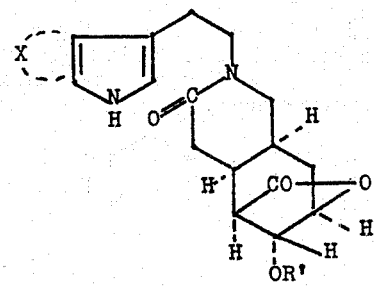

wherein X and R' have the above-given meanings, more especially lactones of the formula:

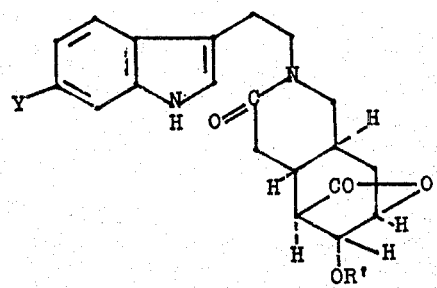

wherein Y represents hydrogen or methoxy, and R' stands for lower alkyl. Also included in the scope of the invention are the lactones of the formula:

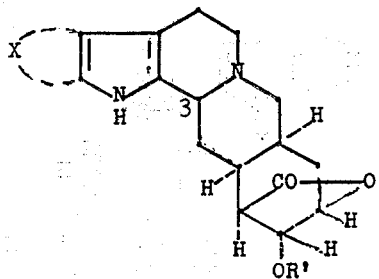

which contain a double bond extending from carbon atom 3 and wherein X and R' have the above-given meanings, or salts thereof, such as lactones of the formula:

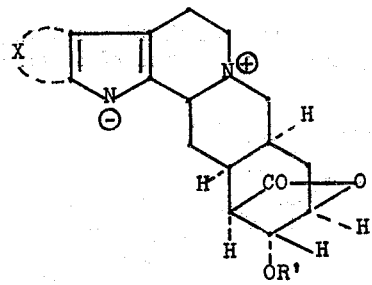

or salts thereof. More especially lactones of the formula:

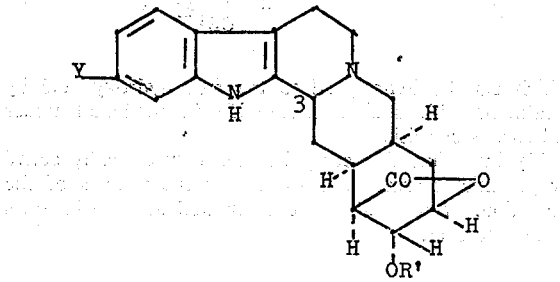

which contain a double bond extending from carbon atom 3 and wherein Y represents hydrogen or methoxy and R' stands for lower alkyl, and salts thereof such as the lactone of the formula:

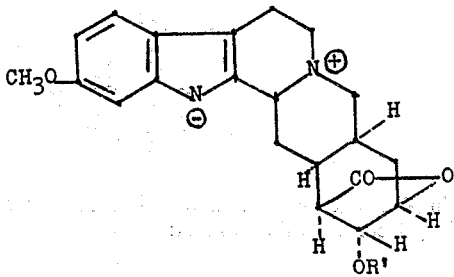

or salts thereof.

The invention comprises also any process, wherein an intermediate obtainable at any stage of the process is used as starting material and the remaining steps are carried out.

This application is a continuation-in-part of my copending application Serial No. 576,833, filed April 9, 1956 (now abandoned).

The example which follows is given in the way of illustration and shall not be construed as a limitation. Many modifications will appear obvious to the man skilled in the art and it is intended that such obvious modifications are also comprised by my invention. Temperatures are given in degrees Centigrade.

Example 5 g. of N-[2'-(6"-methoxy-3"-indolyl)-ethyl]-3-oxo-5β-carbomethoxy-6α-methoxy-7β-acetoxy - 1,2,3,4,5α,6β,-7α,8,9α,10α-decahydro-isoquinoline are refluxed with 13.2 g. of potassium hydroxide in 200 ml. of methanol for two hours. After cooling the solution is acidified with hydrochloric acid (1:1), the potassium chloride is filtered off and the residue thoroughly washed with 200 ml. of a 1:1-mixture of chloroform and methanol. The combined methanol-chloroform portions are evaporated to dryness under reduced pressure. The residue is then crystallized from a 1:1-mixture of chloroform and methanol by the addition of hexane yielding N-[2'-(6"-methoxy-3"-indolyl)-ethyl]-3-oxo-5β-carboxy-6α-methoxy-7β-hydroxy-1,2,3,4,5α,6β,7α,8,9α,10α-decahydroisoquinoline.

1 g. of the latter is dissolved in a mixture of 20 ml. of dry pyridine and 5 ml. of acetic anhydride by warming. After standing for 16 hours the solution is concentrated under reduced pressure to dryness whereupon the [5β→7β]-lactone of N-[2'-(6"-methoxy-3"-indolyl)-ethyl]-3-oxo-5-carboxy-6α-methoxy-7β-hydroxy - 1,2,3,4,-5α,6β,7α,8,9α,10α-decahydroisoquinoline crystallizes. The compound is recrystallized from methanol.

To 0.8 g. of this lactone are added 100 ml. of benzene and 10 g. of phosphorus oxychloride. After standing at 22° for twelve hours, the mixture is heated on the steam bath for two hours, cooled and then evaporated to dryness under reduced pressure. The residue is taken up in five successive portions of hot aqueous hydrochloric acid (10 ml. each), the extracts are cooled, concentrated under reduced pressure at 30° to about onefifth of the original volume and then chilled in ice. The crystalline didehydro-reserpic acid lactone chloride is isolated by filtration.

0.5 g. of didehydro-reserpic acid lactone chloride is dissolved in a mixture of 25 ml. of dioxane and 25 ml. of methanol. 1 g. of sodium borohydride is then added with cooling in an ice bath. After standing at 5° for two hours and at 22° for twelve hours the reaction mixture is poured into 500 ml. of water and extracted ten times with a total amount of 200 ml. of chloroform. The chloroform solution is washed once with 200 ml. of water, then dried over 5 g. of magnesium sulfate, filtered and evaporated under reduced pressure. The iso-reserpic acid lactone is obtained in crystalline form.

The conversion of 3-iso-reserpic acid lactone to reserpine can, for example, be accomplished as follows:

0.1 mg. of 3-iso-reserpic acid lactone is refluxed in 5 ml. of acetic acid for 16 hours. The acetic acid is distilled off to a small volume, water added and the mixture basified with aqueous ammonia. The mixture is extracted with chloroform, the chloroform distilled off and the resulting crystalline reserpic acid lactone collected by filtration after the addition of methanol. It is recrystalized from chloroform and melts at 305–310°.

To 0.1 g. of reserpic acid lactone is added a solution of sodium methylate in 25 ml. of methanol. The mixture is refluxed for one and one-half hours whereupon the lactone completely dissolves. The solution is cooled to room temperature, adjusted to pH 6–7 with hydrochloric acid (1:1) and concentrated under reduced pressure to a volume of 3 ml. 25 ml. of water is added and the solution is acidified to pH 4–5 with hydrochloric acid (1:1). Ammonia is added and the solution having a pH of 9–10 is extracted four times with a total amount of 60 ml. of chloroform. The chloroform solution is dried over sodium sulfate and evaporated under reduced pressure whereupon methyl reserpate is obtained.

To a solution of 0.1 g. of methyl reserpate in 2 ml. of dry pyridine are added slowly with cooling 2 ml. of a pyridine solution containing 0.260 g. of 3,4,5-trimethoxybenzoyl chloride. The reaction mixture is allowed to stand at room temperature for 66 hours. At the end of that time 20 ml. of water are slowly added and the resulting solution distilled to dryness under reduced pressure at 40°. The residue is taken up in chloroform and washed successively with water, 1 percent aqueous sodium hydroxide solution and water. After drying, the solvent is removed under reduced pressure at 40° leaving a semi-crystalline residue. Upon recrystallization from acetone a compound is obtained showing no difference in the infra red spectrum with reserpine derived from natural sources.

What is claimed is:

1. A process according to claim 8, wherein sodium borohydride is used as a reducing agent.

2. Compounds of the formula:

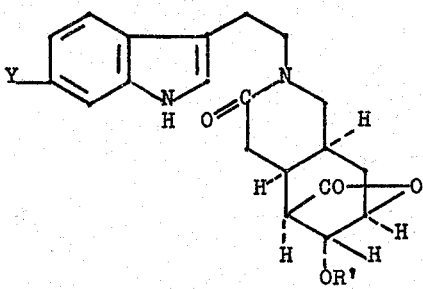

wherein Y stands for a member of the group consisting of hydrogen and methoxy and R' represents lower alkyl.

3. A compound of the formula:

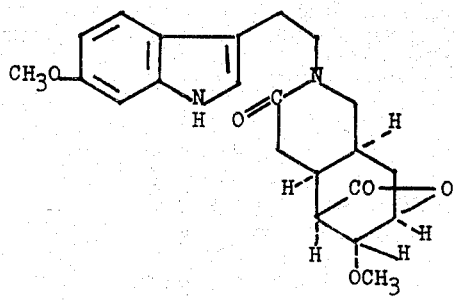

4. A compound of the formula:

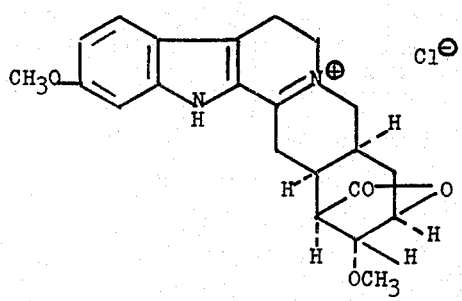

5. The compound of the formula:

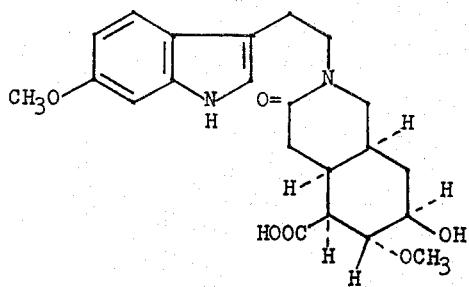

6. A member of the group consisting of a compound of the formula:

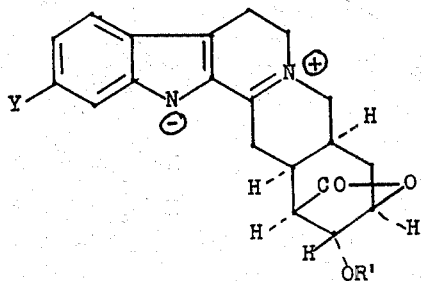

in which Y represents a member of the group consisting of hydrogen and methoxy, R' stands for lower alkyl, and an acid addition salt thereof.

7. A process according to claim 8, wherein the ring closing agent is a phosphoric acid derivative.

8. Process for the preparation of a member of the group consisting of a compound of the formula:

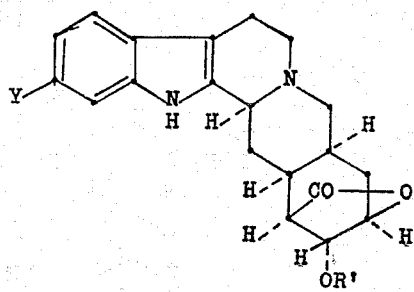

in which Y stands for a member of the group consisting of hydrogen and methoxy and R' for a lower alkyl radical, and an acid addition salt thereof, which comprises treating a compound of the formula:

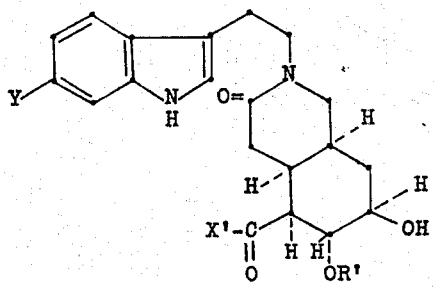

in which Y and R' have the above given meaning, and X' stands for a member of the group consisting of hydroxyl and lower alkoxy with a dehydrating agent selected from the group consisting of a chloride and an anhydride of a strong inorganic and a strong organic acid, a carbodiimide and an aluminum alcoholate, converting a resulting lactone of the formula:

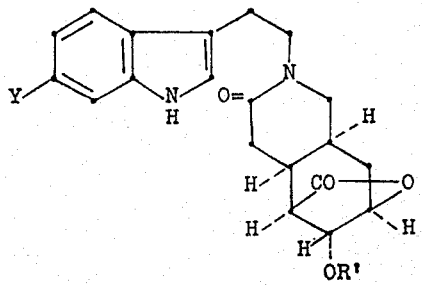

into a member of the group consisting of a lactone of the formula:

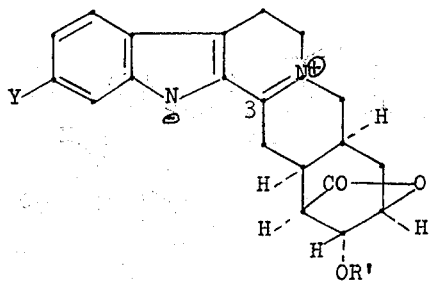

in which formulae Y and R' have the above given meaning, and an acid addition salt thereof, by treatment with a ring closing agent selected from the group consisting of a strong inorganic acid, an anhydride and an acid chloride thereof and a mixture of such compounds, and reducing the double bond in the 3-position with a hydrogenating agent selected from the group consisting of catalytically activated hydrogen, sodium borohydride, an alkali metal in wet ether, an alkali metal amalgam and zinc in an acidic medium, to produce a member of the group consisting of compounds of the formula:

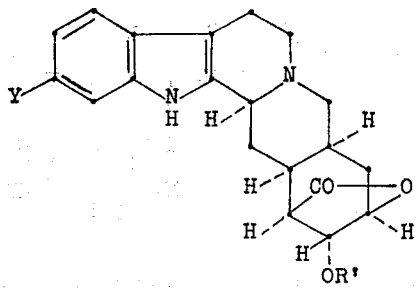

in which Y and R' have the above given meaning, and an acid addition salt thereof.

9. A process according to claim 8, wherein the racemic d,l-form of a compound of the formula

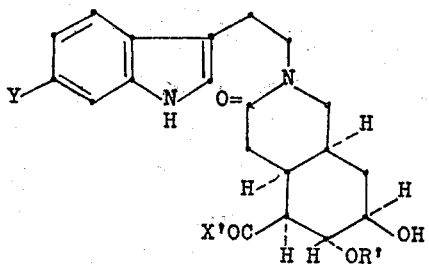

in which Y stands for a member of the group consisting of hydrogen and methoxy, X' stands for a member of the group consisting of hydroxyl and lower alkoxy, and R' represents lower alkyl is used as the starting material.

10. Process according to claim 8, wherein the optically active l-form of a compound of the formula

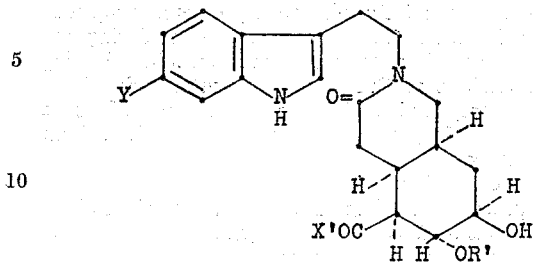

in which Y stands for a member of the group consisting of hydrogen and methoxy, X' stands for a member of the group consisting of hydroxyl and lower alkoxy, and R' represents lower alkyl is used as the starting material.

11. Compounds of the formula:

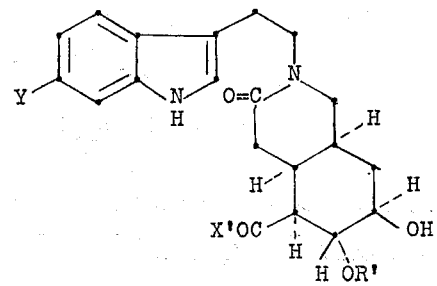

in which Y stands for a member of the group consisting of hydrogen and methoxy, X' stands for hydroxyl and R' for lower alkyl.

12. Compounds of the formula:

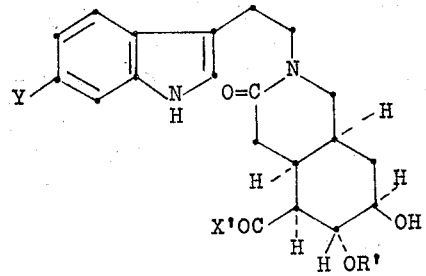

in which Y stands for a member of the group consisting of hydrogen and methoxy, X' stands for a member of the group consisting of methoxy and ethoxy, and R' represents lower alkyl.

References Cited in the file of this patent

Woodward: Jour. of Amer. Chem. Soc., vol. 78, pp. 2023–2025 (1956).

MacPhillamy: Jour. Amer. Chem. Soc., vol. 77, pp. 1071–1072 and 4335–4343 (1955).